_United States Patent Office_

3,406,209
Patented Oct. 15, 1968

3,406,209
1,1-BIS(p-OH-PHENYL)-2,2-DISUBSTITUTED
ETHYLENES
Ernst H. Barany, Farmakologiska Institutionen, Uppsala,
Sweden, and Jean Francois Miquel, Montpellier, France
No Drawing. Continuation-in-part of application Ser. No.
232,249, Oct. 22, 1962. This application Feb. 8, 1966,
Ser. No. 525,866
The portion of the term of the patent subsequent to
Feb. 22, 1983, has been disclaimed
11 Claims. (Cl. 260—619)

This application is a continuation-in-part of our application having the Ser. No. 232,249, filed Oct. 22, 1962 (now Patent No. 3,237,200) which in turn is a continuation-in-part of application S.N. 796,204, filed on Mar. 2, 1959, now abandoned.

This invention relates to new chemical compounds having pharmacological activity comprising in particular the ability of inhibiting the secretion of gonadotrophins from the pituitary gland accompanied by a favourably low oestrogenicity.

In the treatment of certain diseases using agents having an inhibiting effect on the secretion of gonadotrophins from the pituitary gland the agents used such as oestradiol and stilboestrol also have a very strong oestrogenic activity which may cause undesired side effects such as feminization of male individuals. This oestrogenicity has in fact made it disadvantageous to use oestradiol and stilboestrol.

Extensive investigations carried out by us have shown that said risk is eliminated only if the agents used fulfill certain requirements, viz. have a not too low pituitary inhibiting activity to eliminate the necessity of administrating excessively high doses and at the same time have a high pituitary inhibiting activity in comparison to the oestrogenic activity. Said requirements are best expressed by means of a comparative index which is calculated according to the following formula (CI=comparative index):

$$CI = \frac{o}{p} : p = \frac{o}{p^2}$$

wherein $o$ means oestrogenic dose and $p$ means pituitary inhibiting dose and wherein the two activities are expressed as the dosage necessary to obtain a given effect on rats. When using said index due regard is paid both to the absolute pituitary inhibiting activity ($p$) and the specific pituitary inhibiting activity, i.e. the pituary inhibiting activity relative to the oestrogenic activity ($o/p$). It has been found that the above-mentoned requirements are fulfilled if the comparative index $o/p^2$ is at least 15 and preferably at least 20.

Intensive investigations have shown that there are a number of 1,1-bis(p-OH-phenyl)2,2-disubstituted ethylenes which fulfill the above requirements. Said ethylenes correspond to the general formula

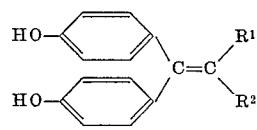

where $R^1$ is a member of the group consisting of methyl and ethyl radicals, $R^2$ is a member of the group consisting of straight and branched, alkyl and alkenyl radicals containing from three to five carbon atoms.

The invention also includes all steric isomers comprised by the general Formula I.

According to the invention compounds of the Formula I are prepared by dehydrating a compound having the general formula

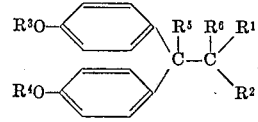

in which $R^1$, $R^2$ are as hereinbefore defined, $R^3$ and $R^4$ are both alkyl or one of them H and the other alkyl, and in which one of the symbols $R^5$ and $R^6$ is hydrogen and the other a hydroxy group to an ethylene with the formula

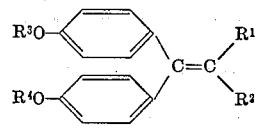

in which $R^1$, $R^2$, $R^3$ and $R^4$ are as hereinbefore defined, and dealkylating comp. III.

Said carbinols may be prepared in a manner known per se. A large number of methods for the preparation of tertiary carbinols of this kind and their esters are previously known. The carbinols are usually prepared in situ and most often need not be isolated in pure state but may be used directly for the preparation of the ethylenes of the invention. An example of a useful method is the reaction of ketones having the general formula

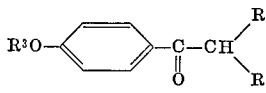

in which $R^1$, $R^2$ and $R^3$ are as hereinbefore defined, with a Grignard reagent having the general formula

in which $R^4$ is an alkyl. There is thus formed a magnesium complex of the ketone and the Grignard reagent which is decomposed in conventional manner to form the desired carbinol for example by the addition of water or dilute acids, such as dilute hydrochloric acid. The carbinol thus formed need not be isolated in pure state in order to be possible to use in preparing the ethylenes of the invention. It is sufficient to recover the carbinol from the aqueous reaction mixture by extraction with a suitable organic solvent for the carbinol and partially of completely immiscible with water, and to evaporate the extract obtained.

The process described gives a carbinol having the general Formula II, i.e. wherein one of the symbols $R^5$ is a hydroxy group while the other $R^6$ is a hydrogen atom.

Said carbinols are dehydrated by distillation at 0.01–0.1 mm. Hg and the ethylenes with Formula III are isolated in good yields. The product may then be further recrystallized.

The product thus obtained may be a mono or dialkyl ether. According to a preferred embodiment of the invention the alkyl radicals may be removed in conventional manner, preferably by reacting the ether with a nucleophilic agent, such as an alkali metal hydroxide, e.g. sodium and potassium hydroxide. The reaction is conveniently carried out in the presence of a polar organic solvent, such as lower alcohols having one to eight carbon atoms, e.g. methanol and ethanol, or in glycol ethers, e.g. triethylene glycol, in aqueous to anhydrous state at increased temperatures and preferably at a temperature of from about 150 to 250° C. The pressure to be used of course depends on the solvent used. The lower alcohols may be used in an autoclave but the triethylene glycol can be used at atmospheric pressure. The dealkylated compounds of the invention thus obtained, i.e. the free p,p'-dihydroxy compounds, may be isolated, in the following manner.

The reaction mixture is diluted with water and neutralized with a suitable acid for example hydrochloric acid, acetic acid and the like. The ethylene compound can be extracted with a suitable organic solvent. Upon drying the solution, for instance with anhydrous sodium sulphate or magnesium sulphate the solvent may be removed by distillation and the ethylene compound may be distilled at reduced pressure, preferably at about 0.001 to 0.1 mm. of Hg. The dihydroxy compounds thus obtained may be also be recrystallized from suitable solvents.

According to still another embodiment of the invention the crude p,p'-dihydroxy compounds corresponding to the general Formula I are esterified in conventional manner to the diesters of lower alkancarboxylic acids. The esters are purified by distillation at 0.01–0.1 mm. Hg and recrystallized. The hydroxy-compounds are then recovered by hydrolysis of the esters in conventional manner by heating the same with an alcoholic sodium or potassium hydroxide solution. The free p,p'-dihydroxy compounds are isolated in conventional manner.

Examples of specially suitable p,p'-dihydroxy compounds corresponding to the acetyl compounds, claimed in parent application S.N. 232,249, are tabulated below and the index $o/p^2$ registered. The values of $o/p^2$ are greater than 25.

TABLE A

[1,1-bis(p-hydroxy phenyl)-2-$R^1$-2$R^2$-ethylene]

| $R^1$ | $R^2$ | $o/p^2$ |
|---|---|---|
| Methyl | Propyl | 40 |
| Do | i-Propyl | 35 |
| Do | Propenyl | 50 |
| Do | Butyl | 30 |
| Do | Butenyl | 30 |
| Do | l-Amyl | 25 |
| Ethyl | Propyl | 150 |
| Do | i-Propyl | 15 |
| Do | Propenyl | 800 |
| Do | Butyl | 30 |
| Do | l-Amyl | 25 |

The British patent specification No. 537,976 discloses the preparation of compounds related to the compounds of this invention but does not specifically describe the special group of compounds falling under the definition of the general Formula I stated above. The selective character of this invention is clearly seen from the fact that compounds falling just outside the scope of Formula I as hereinbefore defined, viz. compounds in which $R^1$ and $R^2$ are both methyl, both ethyl, both propyl or in which $R^1$ is methyl and $R^2$ ethyl or $R^1$ is propyl and $R^2$ is isoamyl all have a lower index than 15.

Investigations of the physiological activity of the new compounds have shown that they may have a valuable oestrogenic as well as an anti-oestrogenic effect possibly due to comparative antagonism. This behaviour is or example shown by a representative example of the new compounds, viz. 1,1-bis(p-hydroxy phenyl) - 2 - ethyl - 2- propyl ethylene. The oestrogenic effect of this compound differs from that of the previously known oestrogens in that it is more limited in character which may be an important property in certain applications. The known oestrogens stimulate the male accessory sexual glands, for example the seminal vesicles of rodents. At doses which give equal inhibition of the pituitary this is the case to a much smaller degree with 1,1-bis(p-hydroxy phenyl)-2-ethyl-2-propyl ethylene. The maximum growth attainable in certain organs under the action of this compound of the invention is less than that of the usual oestrogens. This is of a particular importance in applications in which feminization of the subject is highly undersirable. Such feminization is effected by the usual oestrogens but only to a much smaller and relatively insignificant degree by this compounds of the invention. This fact makes 1,1-bis(p-hydroxy phenyl)-2-ethyl-2 - propyl ethylene better suited for uses in which the pituitary inhibiting effect and the anti-androgenic effect thereof are of primary importance.

The therapeutically active compounds of the invention may be administered as such or together with suitable carriers which are pharmacologically acceptable. The carrier is selected according to the route of administration to be used as well as according to the physical properties of the compounds and standard practice. The dosage to be used is determined by the condition involved but in general the dosage of the compounds is of approximately the same order as the dosage of similar compounds used for treatment of the same condition.

For oral administration the compounds may be administered in the form of tablets containing usual excipients and fillers such as starch, milk sugar and the like. Aqueous suspensions and elixirs may also be used and may contain usual sweetening and flavouring agents. In the treatment of some conditions the compounds may also be used in the form of topical compositions prepared by the use of conventional ointment and salve bases. The compounds may also be administered parenterally the dosage forms being prepared according to standard pharmaceutical practice. The invention includes within its scope also pharmaceutical compositions prepared from the compounds of the invention and carriers or excipients of the above-mentioned kind.

The synthesis of the new compounds is further illustrated by way of the following specific examples which, however, are not to be construed as limiting the invention in any manner. The general methods of preparing the starting compounds and the compounds of the invention is first illustrated and physical properties of representative compounds thus prepared are then stated in a following table.

I. Preparation of a starting product of Formula III

To a Grignard-solution (prepared from 1.1 moles of magnesium turning, 1.0 mole of p-methoxy-phenyl bromide and 200 mls. of dry ether) in a three-necked flask equipped with a reflux condenser, a dropping funnel and a sealed stirrer was added 1.0 mol of a ketone of the general Formula IV in the form of a solution in 100 mls. of dry ether during a period of about 30 minutes. Upon boiling for one hour under vigorous stirring the Grignard complex was decomposed with 5 N sulphuric acid. The ether layer was separated, washed with an aqueous saturated sodium chloride solution and dried over anhydrous sodium sulphate. The ether was removed by evaporation and the bis(p-methoxy phenyl) ethylene carbinol thus formed was distilled in vacuum as an oil to provide a compound of Formula III which was purified by redistillation or recrystallization. Representative compounds thus prepared and their physical data are stated in the following table B.

TABLE B

| Name | Boiling point in ° C. at mms of Hg (uncorr.) | $n_d^{25°}$ |
|---|---|---|
| 1,1-bis(p-methoxy phenyl)-2-methyl-2-n-propyl ethylene | 171–173/0.8 | 1.5733 |
| 1,1-bis(p-methoxy phenyl)-2-methyl-2-iso-propyl ethylene | 167–168/0.7 | 1.5733 |
| 1,1-bis(p-methoxy phenyl)-2-methyl-2-butene-(2)-yl ethylene | 143/0.05 | 1.5854 |
| 1,1-bis(p-methoxy phenyl)-2-methyl-2-n-butyl ethylene | 184/0.8 | 1.5681 |
| 1,1-bis(p-methoxy phenyl)-2-ethyl-2-n-propyl ethylene | 176/0.7 | 1.5656 |

II. Preparation of bis(p-hydroxy phenyl) ethylenes of Formula I by dealkylation of the corresponding bis (p-methoxy phenyl) ethylenes of Formula III 0.35 mole of a bis(p-methoxy phenyl) ethylene of the general Formula III, 100 gms. of potassium hydroxide pellets and 400 mls. of triethylene glycol were mixed in a three-necked flask equipped with an eight inch high glass tube, a sealed stirrer and a contact thermometer adjusted on 210° C. The mixture was heated by means of an electric heating mantle and was maintained at 210° C. for three hours. Upon cooling to room temperture the dark-brown mixture was poured into 1,000 mls. of water, extracted with ether and acidified with 5 N hydrochloric acid. The dark-brown oil which separated was taken up into ether, washed with a saturated aqueous sodium chloride solution to neutral reaction and was dried over anhydrous sodium sulphate. The ether was removed by evaporation and the residue was distilled in highvacuum. The free phenol thus obtained was recrystallized from an organic solvent. The solvents used and the melting points of representative compounds thus prepared are stated in the following table C.

TABLE C

[1,1-bis(p-hydroxy phenyl)-2-$R^1$-2$R^2$-ethylene]

| $R^1$ | $R^2$ | Solvents for recryst. | M.P. corr. |
|---|---|---|---|
| Methyl | Propyl | Toluene+methanol | 173–174 |
| Do | i-Propyl | Methanol+water | 191–192 |
| Do | Propenyl | do | 160–162 |
| Do | Butyl | Toluene | 146–147 |
| Do | Butenyl | Methanol+water | 140–142 |
| Do | i-Amyl | Toluene | 130–133 |
| Ethyl | Propyl | Benzene | 174–175 |
| Do | i-Propyl | Methanol+water | 180–182 |
| Do | Propenyl | do | 168–170 |
| Do | Butyl | Toluene | 146–147 |
| Do | i-Amyl | do | 138–140 |

III. Further purification of the hydroxy compound via the bis(p-acetoxy) phenyl-ethylenes 100 gms. of a bis(p-hydroxy phenyl) ethylene of the general Formula I were admixed with 250 mls. of acetic anhydride and a trace of concentrated sulphuric acid were added to the residue. The reaction mixture which immediately became warm was heated for 30 minutes on a steam-bath. Upon cooling the mixture was poured into water. The acetylated compound which separated as an oil was taken up into ether and washed twice with a saturated aqueous sodium chloride solution. The solvents were removed by evaporation and the bis(p-acetoxy phenyl)-ethylene thus obtained was distilled and recrystallized from ethanol. The melting points and U.V. absorption data of representative compounds thus prepared are stated in the following table D.

TABLE D

| Name | Melting point in ° C. (corr.) | U.V. absorption $\lambda_{max}.m\mu$ | $\times 10^{-4}$ |
|---|---|---|---|
| 1,1-bis(p-acetoxy phenyl)-2-methyl-2-n-propyl ethylene | 74–75 | 245 | 1.60 |
| 1,1-bis(p-acetoxy phenyl)-2-methyl-2-butene-(2)-yl ethylene | 125–126 | 243 | 1.57 |
| 1,1-bis(p-acetoxy phenyl)-2-methyl-2-butene-(2)-yl-ethylene | 144–146 | 282 | 2.03 |
| 1,1-bis(p-acetoxy phenyl)-2-methyl-2-n-butyl ethylene | 84–85 | 245 | 1.61 |
| 1,1-bis(p-acetoxy phenyl)-2-ethyl-2-n-propyl ethylene | 71–72 | 242 | 1.50 |

IV. Preparation of bis(p-hydroxy phenyl)-ethylenes of Formula I 0.015 mole of a pure bis(p-acetoxy phenyl)-ethylene was saponified on the steam bath with 50 mls. of 20% methanolic potassium hydroxide solution for 30 minutes. The free phenol thus obtained was precipitated with 2 N hydrocloric acid, recovered by filtration, washed with water and recrystallized, e.g. from the solvents stated in the table C above.

What we claim is:
1. Compounds having the general formula

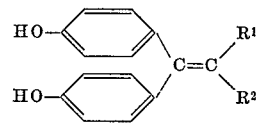

I wherein $R^1$ is a member of the group consisting of methyl and ethyl radicals, $R^2$ is a member of the group consisting of straight and branched alkyl and alkenyl radicals containing from three to five carbon atoms.

2. A compound according to claim 1 in which $R^1$ is methyl and $R^2$ is propyl.

3. A compound according to claim 1 in which $R^1$ is methyl and $R^2$ is isopropyl.

4. A compound according to claim 1 in which $R^1$ is methyl and $R^2$ is propenyl.

5. A compound according to claim 1 in which $R^1$ is methyl and $R^2$ is butyl.

6. A compound according to claim 1 in which $R^1$ is methyl and $R^2$ is isoamyl.

7. A compound according to claim 1 in which $R^1$ is ethyl and $R^2$ if propyl.

8. A compound according to claim 1 in which $R^1$ is ethyl and $R^2$ is isopropyl.

9. A compound according to claim 1 in which $R^1$ is ethyl and $R^2$ is propenyl.

10. A compound according to claim 1 in which $R^1$ is ethyl and $R^2$ is butyl.

11. A compound according to claim 1 in which $R^1$ is ethyl and $R^2$ is isoamyl.

References Cited

UNITED STATES PATENTS 3,237,200  2/1966  Barany et al. _____ 260—613

FOREIGN PATENTS 717,653  1/1943  Germany.

BERNARD HELFIN, *Primary Examiner.*

H. ROBERTS, *Assistant Examiner.*